(12) United States Patent
Yamada

(10) Patent No.: US 8,392,082 B2
(45) Date of Patent: Mar. 5, 2013

(54) CONTROL DEVICE AND CONTROL METHOD FOR AUTOMATIC TRANSMISSION

(75) Inventor: Naohiro Yamada, Atsugi (JP)

(73) Assignee: Jatco Ltd, Fuji-shi (JP)

( * ) Notice: Subject to any disclaimer, the term of this patent is extended or adjusted under 35 U.S.C. 154(b) by 118 days.

(21) Appl. No.: 12/870,173

(22) Filed: Aug. 27, 2010

(65) Prior Publication Data

US 2011/0054751 A1    Mar. 3, 2011

(30) Foreign Application Priority Data

Sep. 2, 2009    (JP) .................................. 2009-202331

(51) Int. Cl.
G06F 7/00       (2006.01)
G06F 17/00      (2006.01)
G06F 19/00      (2011.01)

(52) U.S. Cl. .......................................... 701/67; 701/58

(58) Field of Classification Search ............. 701/58–60, 701/67, 68, 78–80, 87, 88, 90; 477/70, 71, 477/92–95, 181; 475/43, 125, 194, 195, 475/257; 192/54.1, 223

See application file for complete search history.

(56) References Cited

U.S. PATENT DOCUMENTS

| | | | |
|---|---|---|---|
| 4,942,530 A | 7/1990 | Boda et al. | |
| 5,613,921 A | 3/1997 | Sugiyama et al. | |
| 5,679,094 A * | 10/1997 | Nakamura et al. ............ | 477/111 |
| 6,022,288 A | 2/2000 | Cho | |
| 6,152,852 A | 11/2000 | Sakakibara et al. | |
| 6,343,528 B1 | 2/2002 | Tamamoto et al. | |
| 6,843,754 B2 | 1/2005 | Mori et al. | |
| 2001/0020206 A1* | 9/2001 | Nishimura ...................... | 701/54 |
| 2002/0005077 A1* | 1/2002 | Ozaki et al. ................. | 74/336 R |
| 2002/0116110 A1* | 8/2002 | Takatori et al. .................. | 701/55 |
| 2003/0064849 A1* | 4/2003 | Saitou et al. ................... | 475/127 |

(Continued)

FOREIGN PATENT DOCUMENTS

JP    08-028678 A    2/1996
JP    11-132326 A    5/1999

(Continued)

OTHER PUBLICATIONS

U.S. Appl. No. 12/850,315, filed Aug. 4, 2010, Yamada.

(Continued)

Primary Examiner — Jeffrey Shapiro
(74) Attorney, Agent, or Firm — Foley & Lardner LLP

(57) ABSTRACT

A control device for an automatic transmission having a torque converter includes: a determining means for determining whether to set a friction element in an engaged condition or a disengaged condition on the basis of an operating condition of a vehicle; a control means for outputting an engagement command or a disengagement command on the basis of a determination result of the determining means; and an oil pressure control means for performing control to engage the friction element upon reception of the engagement command by performing a precharge control for the friction element and then controlling the supplied oil pressure to a predetermined oil pressure and to disengage the friction element upon reception of the disengagement command by draining the oil pressure supplied to the friction element, wherein the control means comprises a prohibiting means for prohibiting output of the disengagement command in relation to the friction element following control of the friction element from the disengaged condition to the engaged condition until a predetermined condition is established.

12 Claims, 10 Drawing Sheets

U.S. PATENT DOCUMENTS

| | | | |
|---|---|---|---|
| 2003/0119631 A1* | 6/2003 | Yoneyama | 477/156 |
| 2004/0230360 A1* | 11/2004 | Matsumura et al. | 701/51 |
| 2005/0096182 A1 | 5/2005 | Ohta | |
| 2005/0222737 A1 | 10/2005 | Imamura et al. | |
| 2006/0094555 A1* | 5/2006 | Long et al. | 475/116 |
| 2006/0094564 A1 | 5/2006 | Ilda et al. | |
| 2007/0232443 A1* | 10/2007 | Kimura et al. | 477/48 |
| 2008/0076632 A1* | 3/2008 | Watanabe et al. | 477/98 |
| 2008/0153636 A1* | 6/2008 | Inoue et al. | 474/28 |
| 2008/0153655 A1* | 6/2008 | Kawaguchi et al. | 475/276 |
| 2008/0167155 A1* | 7/2008 | Kawaguchi et al. | 475/119 |
| 2008/0227580 A1* | 9/2008 | Kawaguchi et al. | 475/123 |
| 2008/0242501 A1* | 10/2008 | Tsunekawa | 477/62 |
| 2008/0269013 A1 | 10/2008 | Minaki et al. | |
| 2009/0312924 A1* | 12/2009 | Moriya et al. | 701/58 |
| 2009/0319141 A1 | 12/2009 | Suzuki et al. | |
| 2010/0105521 A1* | 4/2010 | Kondo et al. | 477/115 |
| 2011/0054751 A1* | 3/2011 | Yamada | 701/60 |

FOREIGN PATENT DOCUMENTS

| | | |
|---|---|---|
| JP | 2003-269603 A | 9/2003 |
| JP | 2004-138192 A | 5/2004 |
| JP | 2009-030775 A | 2/2009 |
| JP | 2009-092186 A | 4/2009 |

OTHER PUBLICATIONS

F. Kuculay et al., "Intelligente Steuerung von Automatikgetrieben durch den Einsatz der Elektronik", No. 4, Apr. 1994, pp. 228-235.

N. Narumi et al. "Trends of Powertrain Control", Society of Automotive Engineers, Inc. Oct. 1990, pp. 312-323.

N. Yamada, U.S. PTO Notice of Allowance, U.S. Appl. No. 12/850,315, dated Aug. 1, 2012, 15 pages.

* cited by examiner

|  | B1<br>Fr/B | C1<br>I/C | C2<br>D/C | C3<br>H&LR/C | B2<br>LOW/B | B3<br>2346/B | B4<br>R/B | F1 | F2 |
|---|---|---|---|---|---|---|---|---|---|
| 1st | (○) |  |  | (○) | ○ |  |  | ○ | ○ |
| 2nd |  |  |  | (○) | ○ | ○ |  |  | ○ |
| 3rd |  |  | ○ |  | ○ | ○ |  |  |  |
| 4th |  |  | ○ | ○ |  | ○ |  |  |  |
| 5th |  | ○ | ○ | ○ |  |  |  |  |  |
| 6th |  | ○ |  | ○ |  | ○ |  |  |  |
| 7th | ○ | ○ |  | ○ |  |  |  | ○ |  |
| Rev. | ○ |  |  | ○ |  |  | ○ |  |  |

*FIG. 3*

|      | 1t      | 2nd     | 3rd     | 4th     | 5th     | 6th     | 7th     | Rev     |
|------|---------|---------|---------|---------|---------|---------|---------|---------|
| SOL1 | ON(○)   | ON(○)   | ON(○)   | OFF(×)  | OFF(×)  | OFF(×)  | OFF(×)  | OFF(×)  |
| SOL2 | ON(×)   | ON(×)   | ON(×)   | ON(×)   | OFF(○)  | OFF(○)  | OFF(○)  | ON(×)   |
| SOL3 | ON(○)   | OFF(×)  | OFF(×)  | OFF(×)  | OFF(×)  | OFF(×)  | ON(○)   | ON(○)   |
| SOL4 | OFF(○)  | OFF(○)  | ON(×)   | OFF(○)  | OFF(○)  | OFF(○)  | OFF(○)  | OFF(○)  |
| SOL5 | OFF(×)  | ON(○)   | ON(○)   | ON(○)   | OFF(×)  | ON(○)   | OFF(×)  | OFF(×)  |
| SOL6 | ON(×)   | ON(×)   | OFF(○)  | OFF(○)  | OFF(○)  | ON(×)   | ON(×)   | ON(×)   |
| SOL7 | ON(○)   | ON(○)   | ON(○)   | OFF(×)  | OFF(×)  | OFF(×)  | OFF(×)  | ON→OFF  |

*FIG. 4*

CONTROL DEVICE AND CONTROL METHOD FOR AUTOMATIC TRANSMISSION

TECHNICAL FIELD OF THE INVENTION

This invention relates to control device and control method for an automatic transmission which controls an engagement condition of a lockup clutch in a torque converter.

BACKGROUND OF THE INVENTION

A torque converter installed in a transmission of a vehicle is provided with a lockup clutch serving as a friction element. By setting the lockup clutch in an engaged condition, a deviation between input/output rotation speeds of the torque converter is suppressed, leading to an improvement in the fuel efficiency of an engine.

JP2004-138192A discloses a lockup clutch control method in which a slip rotation speed between a pump impeller and a turbine impeller in a torque converter is controlled by precharging a supplied fluid pressure to eliminate a dead zone of a piston and supplying further fluid pressure following the precharge to increase a pressing force of a piston has been disclosed as a control method for a lockup clutch of a torque converter.

In this conventional technique, the lockup clutch is engaged when an operating condition of the vehicle is within a lockup ON region and the lockup clutch is set in a disengaged condition when the operating condition of the vehicle is not in the lockup ON region.

SUMMARY OF THE INVENTION

In the conventional technique described above, when the operating condition of the vehicle is in the vicinity of a boundary between the lockup ON region (an engagement region hereafter) and a non-lockup ON region (a disengagement region hereafter), the operating condition may switch between the engagement region and the disengagement region frequently due to slight variation therein, such as an accelerator operation by a driver, variation in a road surface gradient, and variation in parameters (a vehicle speed, a brake pedal opening, a throttle valve opening, and so on) used to determine the operating condition.

In this case, when the operating condition shifts from the engagement region to the disengagement region and then returns immediately to the engagement region, the operating condition is determined to be in the disengagement region, and on the basis of this determination, precharging of the friction element is terminated and oil pressure is drained from a piston chamber. Accordingly, when the operating condition shifts from the disengagement region to the engagement region, precharging is started again to control the friction element to the engaged condition, and as a result, responsiveness between the point at which the operating condition enters the engagement region and the point at which the friction element enters the engaged condition decreases. Hence, the vehicle may travel in the disengaged condition for a long time, leading to deterioration of the fuel efficiency.

This invention has been designed in consideration of this problem, and an object thereof is to provide a control device for an automatic transmission with which an improvement in fuel efficiency can be achieved.

According to an aspect of this invention, a control device for an automatic transmission having a torque converter in which a target gear position is set on the basis of a vehicle speed and an engine load includes: a determining unit that determines whether to set a friction element that locks up the torque converter through oil pressure control in an engaged condition or a disengaged condition on the basis of an operating condition of a vehicle; a control unit that outputs an engagement command or a disengagement command on the basis of a determination result of the determining unit; and an oil pressure control unit that controls to engage the friction element upon reception of the engagement command by performing a precharge control for the friction element and then controlling the supplied oil pressure to a predetermined oil pressure and to disengage the friction element upon reception of the disengagement command by draining the oil pressure supplied to the friction element, the control unit includes a prohibiting unit that prohibits output of the disengagement command in relation to the friction element following control of the friction element from the disengaged condition to the engaged condition until a predetermined condition is established.

According to another aspect of this invention, a control method for an automatic transmission having a torque converter in which a target gear position is set on the basis of a vehicle speed and an engine load includes: a determining step for determining whether to set a friction element that locks up a torque converter through oil pressure control in an engaged condition or a disengaged condition on the basis of an operating condition of a vehicle; a control step for outputting an engagement command or a disengagement command on the basis of a determination result of the determining means; and an oil pressure control step for performing control to engage the friction element upon reception of the engagement command by performing a precharge control for the friction element control and then controlling the supplied oil pressure to a predetermined oil pressure and to disengage the friction element upon reception of the disengagement command by draining the oil pressure supplied to the friction element, the control step includes a prohibiting step for prohibiting output of the disengagement command in relation to the friction element following control of the friction element from the disengaged condition to the engaged condition until a predetermined condition is established.

The details as well as other features and advantages of this invention are set forth in the remainder of the specification and are shown in the accompanying drawings.

BRIEF DESCRIPTION OF THE DRAWINGS

FIG. 3 is an illustrative view of an engagement operation table according to an embodiment of this invention.

FIG. 4 is an illustrative view illustrating operation states of a solenoid valve according to an embodiment of this invention.

DESCRIPTION OF THE PREFERRED EMBODIMENTS

A control device for an automatic transmission according to an embodiment of this invention will be described below with reference to the figures.

Figure 1:
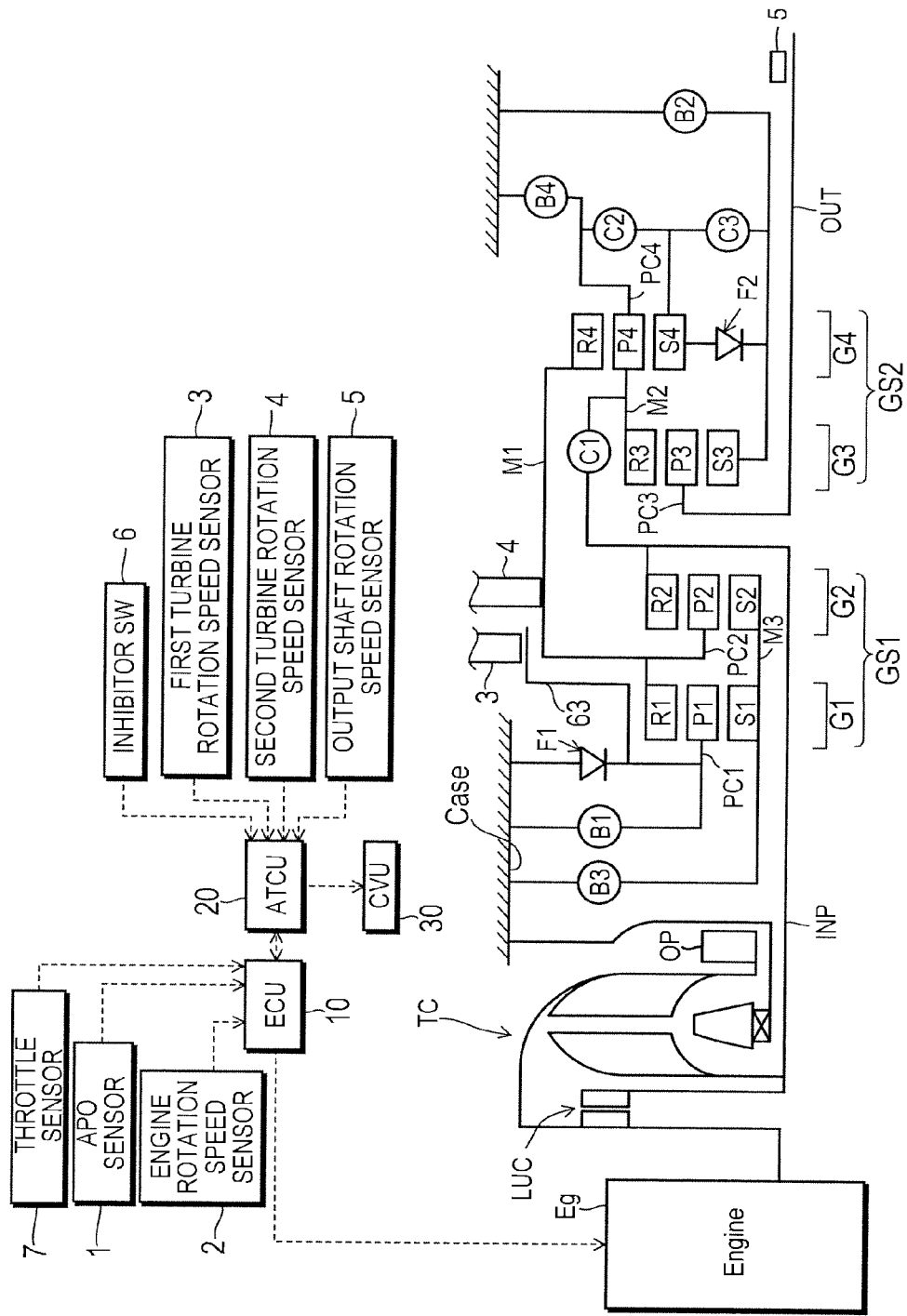
FIG. 1 is an illustrative view illustrating the constitution of an automatic transmission according to an embodiment of this invention.

FIG. 1 is an illustrative view illustrating the constitution of an automatic transmission according to an embodiment of this invention.

The automatic transmission according to this embodiment is an automobile transmission having seven forward gear positions and one reverse gear position, which is connected to an engine Eg of a vehicle via a torque converter TC including a lockup clutch LUC. Rotation output from the engine Eg is transmitted to a pump impeller and an oil pump OP of the torque converter TC, whereupon oil agitated by rotation of the pump impeller is transmitted to a turbine runner via a stator. As a result, an input shaft INP is driven.

The vehicle, not shown in the drawing, is further provided with an engine controller (ECU) 10 that controls a driving condition of the engine Eg, an automatic transmission controller (ATCU) 20 that controls a shift condition and so on of the automatic transmission, and a control valve unit (CVU) 30 that executes hydraulic control on a clutch, a brake, and so on based on output signals from the ATCU 20. The ECU 10 and the ATCU 20 are connected via a CAN communication line or the like so as to share sensor information and control information with each other through communication.

An accelerator opening sensor 1 that detects an accelerator pedal operation amount (accelerator pedal opening) APO generated by a driver, a throttle opening sensor 1a that detects a throttle opening TVO of the engine, and an engine rotation speed sensor 2 that detects an engine rotation speed are connected to the ECU 10. On the basis of the engine rotation speed and the accelerator pedal opening APO, the ECU 10 controls a fuel injection amount and the throttle opening, whereby the engine rotation speed and an engine torque are controlled.

A first turbine rotation speed sensor 3 that detects a rotation speed of a first carrier PC1, a second turbine rotation speed sensor 4 that detects a rotation speed of a first ring gear R1, an output shaft rotation speed sensor 5 that detects a rotation speed of an output shaft OUT, and an inhibitor switch 6 that detects a shift lever operation condition generated by the driver, all of which will be described below, are connected to the ATCU 20. The shift lever includes, in addition to P, R, N and D positions, an engine brake range position in which an engine brake is operative and a normal forward travel range position in which the engine brake is inoperative.

The ATCU 20 includes a rotation speed calculation unit that calculates a rotation speed of the input shaft INP. During a normal operation, the ATCU 20 sets an optimum target gear position from a shift map of the seven forward speeds, to be described below, on the basis of a vehicle speed Vsp and either the throttle opening TVO or the accelerator pedal opening APO, and outputs a control command to the CVU 30 to realize the target gear position.

Further, the ATCU 20 performs control to set the lockup clutch LUC of the torque converter TC in an engaged condition or a disengaged condition and outputs a control command to the CVU 30.

[Constitution of Automatic Transmission]

Next, the constitution of the automatic transmission will be described.

Planetary gear mechanisms are disposed in an axial direction from the input shaft INP side to the output shaft OUT side in order of a first planetary gear set GS1 and a second planetary gear set GS2. Further, a plurality of clutches C1, C2, C3, a plurality of brakes B1, B2, B3, B4, and a plurality of one-way clutches F1, F2 are provided.

The first planetary gear set GS1 includes two planetary gears G1, G2. The first planetary gear G1 is a single pinion planetary gear comprising a first sun gear S1, a first ring gear R1, a first pinion P1 meshed to the two gears S1, R1, and a first carrier PC1 that supports the first pinion P1 rotationally.

The second planetary gear G2 is also a single pinion planetary gear and comprises a second sun gear S2, a second ring gear R2, a second pinion P2 meshed to the two gears S2, R2, and a second carrier PC2 that supports the second pinion P2 rotationally.

The second planetary gear set GS2 includes two planetary gears G3, G4. The third planetary gear G3 is a single pinion planetary gear comprising a third sun gear S3, a third ring gear R3, a third pinion P3 meshed to the two gears S3, R3, and a third carrier PC3 that supports the third pinion P3C rotationally.

The fourth planetary gear G4, similarly to the first to third gear sets, is a single pinion planetary gear comprising a fourth sun gear S4, a fourth ring gear R4, a fourth pinion P4 meshed to the two gears S4, R4, and a fourth carrier PC4 that supports the fourth pinion P4 rotationally.

The input shaft INP is connected to the second ring gear R2 such that a rotary driving force from the engine Eg is input into the second ring gear R2 via the torque converter TC and so on.

The output shaft OUT, on the other hand, is connected to the third carrier PC3 such that an output rotary driving force is transmitted to a drive wheel via a final gear, not shown in the drawing, and so on.

The first ring gear R1, second carrier PC2, and fourth ring gear R4 are connected integrally by a first connecting member M1. The third ring gear R3 and the fourth carrier PC4 are connected integrally by a second connecting member M2, and the second connecting member M2 is connected to the input shaft INP and the second ring gear R2 via the clutch C1.

The first sun gear S1 and the second sun gear S2 are connected integrally by a third connecting member M3.

Hence, in the first planetary gear set GS1, the first planetary gear G1 and second planetary gear G2 are connected by the first connecting member M1 and the third connecting member M3, and therefore the first planetary gear set GS1 is constituted by four rotary elements. In the second planetary gear set GS2, the third planetary gear G3 and fourth planetary gear G4 are connected by the second connecting member M2, and therefore the second planetary gear set GS2 is constituted by five rotary elements.

The first planetary gear set GS1 includes a torque input path for torque input into the second ring gear R2 from the input shaft INP, and the torque input into the first planetary gear set GS1 is output to the second planetary gear set GS2 from the first connecting member M1.

The second planetary gear set GS2 includes a torque input path for torque input into the second connecting member M2 from the input shaft INP and a torque input path for torque input into the fourth ring gear R4 from the first connecting member M1, and the torque input into the second planetary gear set GS2 is output to the output shaft OUT from the third carrier PC3.

Of the clutches C1 to C3, an input clutch C1 selectively connects and disconnects the input shaft INP and the second connecting member M2, while a direct clutch C2 selectively connects and disconnects the fourth sun gear S4 and the fourth carrier PC4.

An H&LR clutch C3 selectively connects and disconnects the third sun gear S3 and the fourth sun gear S4. A second one-way clutch F2 is disposed between the third sun gear S3 and the fourth sun gear S4. The second one-way clutch F2 permits relative rotation between the third sun gear S3 and the fourth sun gear S4 in only one direction and rotates integrally therewith in an opposite direction.

When the H&LR clutch C3 is disengaged and the rotation speed of the fourth sun gear S4 is larger than that of the third sun gear S3, the third sun gear S3 and the fourth sun gear S4 generate independent rotation speeds. Therefore, the third planetary gear G3 and fourth planetary gear G4 are connected via the second connecting member M2 such that the respective planetary gears realize independent gear ratios.

Of the brakes B1 to B4, a front brake B1 selectively halts rotation of the first carrier PC1. A first one-way clutch F1 is disposed parallel to the front brake B1.

A low brake B2 selectively halts rotation of the third sun gear S3. A 2346 brake B3 selectively halts rotation of the third connecting member M3 (the first sun gear S1 and second sun gear S2). A reverse brake B4 selectively halts rotation of the fourth carrier PC4.

[Turbine Rotation Speed Calculation]

The input shaft INP is connected to the second ring gear R2 while the first planetary gear G1 and second planetary gear G2 constitute the first planetary gear set GS1 to which two rotary elements are connected, and therefore the rotation speed calculation unit provided in the ATCU 20 detects the rotation speed of the input shaft INP through calculation using the two turbine rotation speed sensors 3, 4.

The first turbine rotation speed sensor 3 detects the rotation speed of the second carrier PC2, and the second turbine rotation speed sensor 4 detects the rotation speed of a sensor member 63 serving as a turbine sensor member connected to the first carrier PC1.

When the rotation speed of the first carrier PC1 is denoted by N (PC1), the rotation speed of the second carrier PC2 is denoted by N (PC2), the rotation speed of the second ring gear R2 is denoted by N (R2), a gear ratio between the second ring gear R2 and the second carrier PC2 (first ring gear R1) is denoted by 1, and a gear ratio between the first ring gear R1 (second carrier PC2) and the first carrier PC1 is denoted by β, the rotation speed N (R2) of the second ring gear R2 can be calculated using a following equation.

$$N(R2)=(1+1/\beta)\cdot N(PC2)-(1/\beta)\cdot N(PC1)$$

Hence, rotation speed of second ring gear R2 (input shaft INP)=turbine rotation speed can be determined.

[Constitution of Control Valve Unit]

Next, a hydraulic circuit of the CVU 30 will be described using FIG. 2.

The hydraulic circuit is provided with the oil pump OP, which serves as an oil pressure source driven by the engine Eg, a manual valve MV that operates in conjunction with a shift lever operation by the driver to switch an oil passage along which a line pressure PL is supplied, and a pilot valve PV that reduces the line pressure to a predetermined fixed pressure.

The hydraulic circuit is also provided with a first pressure regulating valve CV1 that regulates an engagement pressure of the low brake B2, a second pressure regulating valve CV2 that regulates an engagement pressure of the input clutch C1, a third pressure regulating valve CV3 that regulates an engagement pressure of the front brake B1, a fourth pressure regulating valve CV4 that regulates an engagement pressure of the H&LR clutch C3, a fifth pressure regulating valve CV5 that regulates an engagement pressure of the 2346 brake B3, and a sixth pressure regulating valve CV6 that regulates an engagement pressure of the direct clutch C2.

The hydraulic circuit is further provided with a first switch valve SV1 that switches one of respective oil supply passages 150a, 150b of the low brake B2 and the input clutch C1 to a communicative condition, a second switch valve SV2 that switches one of respective oil supply passages for supplying a D range pressure and an R range pressure to the direct clutch C2 to a communicative condition, a third switch valve SV3 that switches an oil pressure supplied to the reverse brake B4 between an oil pressure supplied from the sixth pressure regulating valve CV6 and an oil pressure supplied from the R range pressure, and a fourth switch valve SV4 that switches an oil pressure output by the sixth pressure regulating valve CV6 between an oil passage 123 and an oil passage 122.

The hydraulic circuit is further provided with a first solenoid valve SOL1 that outputs a pressure control signal to the first pressure regulating valve CV1, a second solenoid valve SOL2 that outputs a pressure control signal to the second pressure regulating valve CV2, a third solenoid valve SOL3 that outputs a pressure control signal to the third pressure regulating valve CV3, a fourth solenoid valve SOL4 that outputs a pressure control signal to the fourth pressure regulating valve CV4, a fifth solenoid valve SOL5 that outputs a pressure control signal to the fifth pressure regulating valve CV5, a sixth solenoid valve SOL6 that outputs a pressure control signal to the sixth pressure regulating valve CV6, and a seventh solenoid valve SOL7 that outputs a switch signal to the first switch valve SV1 and the third switch valve SV3, on the basis of control signals from the automatic transmission control unit 20.

The solenoid valves SOL2, SOL5, SOL6 are respectively constituted by three-way proportioning solenoid valves having three ports, wherein a pilot pressure to be described below is led to a first port, a second port is connected to a drain oil passage, and a third port is connected to a pressure receiving portion of either a pressure regulating valve or a switch valve. The solenoid valves SOL1, SOL3, SOL4 are respectively constituted by two-way proportioning solenoid valves having two ports, and the solenoid valve SOL7 is a three-way ON/OFF solenoid valve having three ports.

The first solenoid valve SOL1, third solenoid valve SOL3, and seventh solenoid valve SOL7 are normally closed (closed when not energized) solenoid valves. The second solenoid valve SOL2, fourth solenoid valve SOL4, fifth solenoid valve SOL5, and sixth solenoid valve SOL6, on the other hand, are normally open (open when not energized) solenoid valves.

[Oil Passage Configuration]

Pressure discharged by the oil pump OP when driven by the engine is regulated to a line pressure and then supplied to an oil passage 101 and an oil passage 102. An oil passage 101a connected to the manual valve MV, which is activated in conjunction with a shift lever operation by the driver, an oil passage 101b that supplies a source pressure of the engagement pressure of the front brake B1, and an oil passage 101c that supplies a source pressure of the engagement pressure of the H&LR clutch C3 are connected to the oil passage 101.

An oil passage 105 and an oil passage 106 that supplies the R range pressure, which is selected during reverse travel, are connected to the manual valve MV, and the manual valve MV switches between the oil passage 105 and the oil passage 106 in accordance with the shift lever operation.

An oil passage 105a that supplies a source pressure of the engagement pressure of the low brake B2, an oil passage 105b that supplies a source pressure of the engagement pressure of the input clutch C1, an oil passage 105c that supplies a source pressure of the engagement pressure of the 2346 brake B3, an oil passage 105d that supplies a source pressure of the engagement pressure of the direct clutch C2, and an oil passage 105e that supplies a switch pressure of the second switch valve SV2, to be described below, are connected to the oil passage 105.

An oil passage 106a that supplies the switch pressure of the second switch valve SV2, an oil passage 106b that supplies the source pressure of the engagement pressure of the direct clutch C2, and an oil passage 106c that supplies the engagement pressure of the reverse brake B4 are connected to the oil passage 106.

An oil passage 103 that supplies the pilot pressure via the pilot valve PV is connected to the oil passage 102. The oil passage 103 is provided with an oil passage 103a that supplies the pilot pressure to the first solenoid valve SOL1, an oil passage 103b that supplies the pilot pressure to the second solenoid valve SOL2, an oil passage 103c that supplies the pilot pressure to the third solenoid valve SOL3, an oil passage 103d that supplies the pilot pressure to the fourth solenoid valve SOL4, an oil passage 103e that supplies the pilot pressure to the fifth solenoid valve SOL5, an oil passage 103f that supplies the pilot pressure to the sixth solenoid valve SOL6, and an oil passage 103g that supplies the pilot pressure to the seventh solenoid valve SOL1.

By constituting the hydraulic circuit in this manner and controlling the respective solenoid valves, the clutches C1 to C3 and brakes B1 to B4 can be engaged and disengaged. The hydraulic circuit also includes a circuit for supplying oil pressure to a piston oil chamber 62 of the lockup clutch LUC.

As shown by an engagement operation table in FIG. 3, by combining engagement (marked by circles) and disengagement (unmarked) of the respective clutches C1 to C3 and brakes B1 to B4 appropriately, the respective gear positions of the seven forward speeds and the single reverse speed can be realized.

[Shift Operations]

Next, shift operations will be described.

(First Speed)

In the first speed, different clutches and brakes are operated depending on whether the engine brake is operative (an engine brake range position has been selected) or inoperative (a normal forward travel range position has been selected). As shown by the (o) marks in FIG. 3, when the engine brake is operative, the first speed is obtained by engaging the front brake B1, the low brake B2, and the H&LR clutch C3. The first one-way clutch F1 provided parallel to the front brake B1 and the second one-way clutch F2 provided parallel to the H&LR clutch C3 also contribute to torque transmission. When the engine brake is inoperative, the front brake B1 and the H&LR clutch C3 are disengaged such that only the low brake B2 is engaged, and torque is transmitted by the first one-way clutch F1 and second one-way clutch F2.

In the first speed, the front brake B1 is engaged (engaged by the first one-way clutch F1 when the engine brake is inoperative), and therefore rotation input into the second ring gear R2 from the input shaft INP is reduced by the first planetary gear set GS1. This reduced rotation is output to the fourth ring gear R4 from the first connecting member M1. Further, the low brake B2 and the H&LR clutch C3 are engaged (engaged by the low brake B2 and the second one-way clutch F2 when the engine brake is inoperative), and therefore rotation input into the fourth ring gear R4 is reduced by the second planetary gear set and output from the third carrier PC3.

In the first speed, torque acts on the front brake B1 (or the first one-way clutch F1), the low brake B2, the H&LR clutch C3 (or the second one-way clutch F2), the first connecting member M1, the second connecting member M2, and the third connecting member M3. In other words, the first planetary gear set GS1 and second planetary gear set GS2 contribute to torque transmission.

At this time, as shown by a solenoid valve operation table in FIG. 4, engagement pressure is supplied to the desired clutches and brakes by switching the first to third solenoid valves SOL1 to SOL3 and the sixth and seventh solenoid valves SOL6, SOL7 ON and switching the other solenoid valves OFF.

Figure 2:
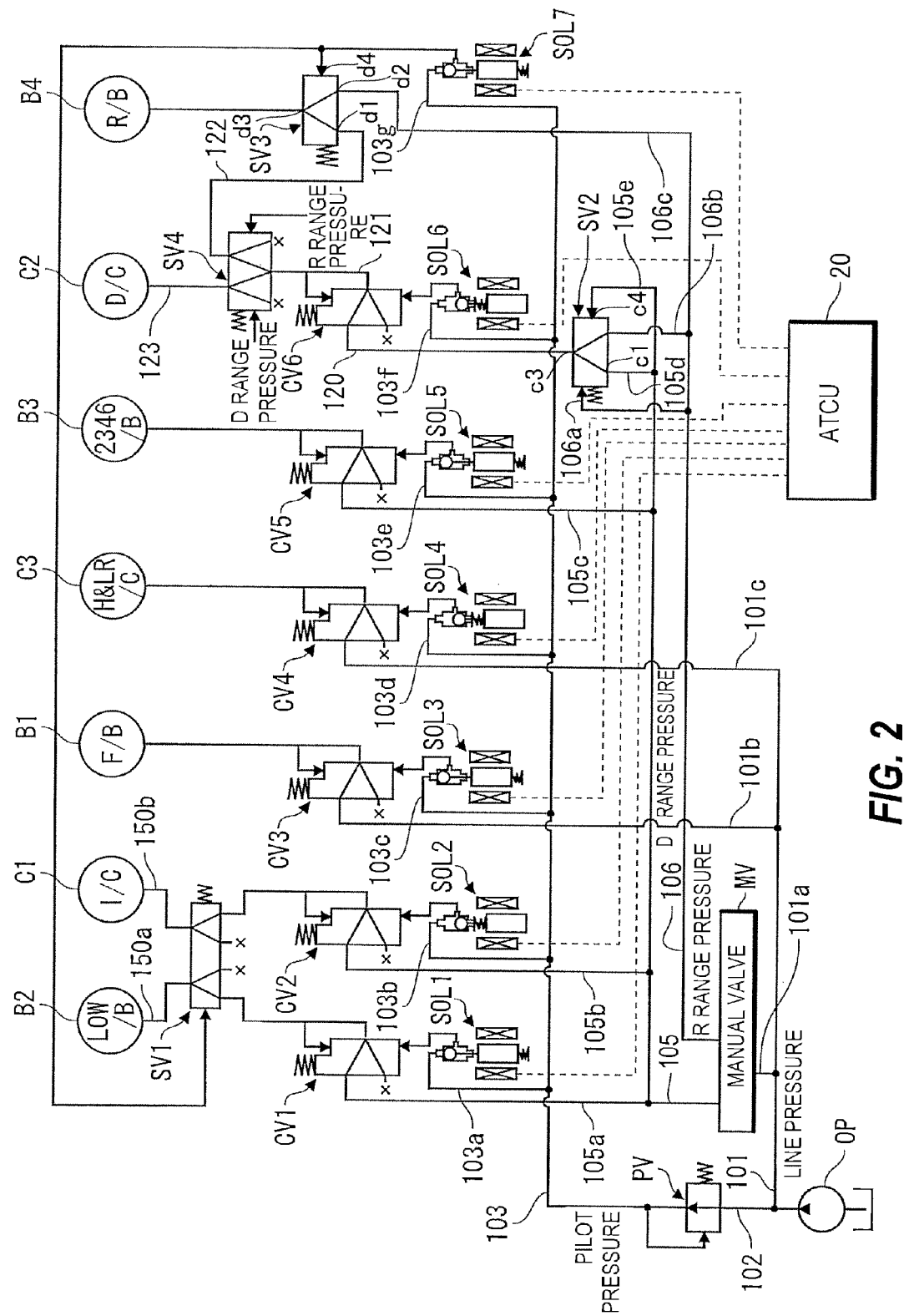
FIG. 2 is an illustrative view illustrating a hydraulic circuit of a control valve unit according to an embodiment of this invention.

Further, since the seventh solenoid valve SOL7 is ON, the first switch valve SV1 moves to the left of FIG. 2 such that the first pressure regulating valve CV1 communicates with the low brake B2 and the input clutch C1 is connected to a drain (an interlocking condition is prevented). Furthermore, since the D range pressure is exerted on a fourth port c4, the second switch valve SV2 moves to the left in FIG. 2 such that a first port c1 communicates with a third port c3, and therefore the D range pressure acts on the sixth pressure regulating valve CV6. The sixth pressure regulating valve CV6 moves downward in FIG. 2, and therefore the D range pressure is not supplied to the direct clutch C2 and the fourth switch valve SV4.

It should be noted that the D range pressure causes the fourth switch valve SV4 to move to the right of FIG. 2 such that the oil passage 121 communicates with the oil passage 123, but this bears no relation to the engagement operation. Further, a signal pressure is supplied to a port d4 from the seventh solenoid valve SOL7, and therefore the third switch valve SV3 moves to the left in FIG. 2 such that a first port d1 communicates with a third port d3, but since no oil pressure is supplied to the oil passage 122, no oil pressure is supplied to the reverse brake B4.

(Second Speed)

In the second speed, different clutches and brakes are engaged depending on whether the engine brake is operative (the engine brake range position has been selected) or inoperative (the normal forward travel range position has been selected). As shown by the (o) marks in FIG. 3, when the engine brake is operative, the second speed is obtained by engaging the low brake B2, the 2346 brake B3, and the H&LR clutch C3. The second one-way clutch F2 provided parallel to the H&LR clutch C3 also contributes to torque transmission. When the engine brake is inoperative, the H&LR clutch C3 is disengaged and the low brake B2 and 2346 brake B3 are engaged, and torque is transmitted by the second one-way clutch F2.

In the second speed, the 2346 brake B3 is engaged, and therefore the rotation input into the second ring gear R2 from the input shaft INP is reduced by the second planetary gear G2 alone. This reduced rotation is output to the fourth ring gear R4 from the first connecting member M1. The low brake B2 and the H&LR clutch C3 are engaged (engaged by the second one-way clutch F2 when the engine brake is inoperative), and therefore the rotation input into the fourth ring gear R4 is reduced by the second planetary gear set and output from the third carrier PC3.

In the second speed, torque acts on the 2346 brake B3, the low brake B2, the H&LR clutch C3 (or the second one-way clutch F2), the first connecting member M1, the second connecting member M2, and the third connecting member M3. In other words, the second planetary gear G2 and the second planetary gear set GS2 contribute to torque transmission.

During an upshift from the first speed to the second speed, the first one-way clutch F1 is disengaged at a point where an engagement capacity of the 2346 brake B3 is secured by disengaging the front brake B1 slightly early and then starting to engage the 2346 brake B3. In so doing, an improvement in shift timing precision can be achieved.

At this time, as shown by the solenoid valve operation table in FIG. 4, engagement pressure is supplied to the desired clutches and brakes by switching the first, second, and fifth to seventh solenoid valves SOL1, SOL2, SOL5, SOL6, SOL7 ON and switching the other solenoid valves OFF.

(Third Speed)

As shown in FIG. 3, the third speed is obtained by engaging the 2346 brake B3, the low brake B2, and the direct clutch C2.

In the third speed, the 2346 brake B3 is engaged, and therefore the rotation input into the second ring gear R2 from the input shaft INP is reduced by the second planetary gear G2. This reduced rotation is output to the fourth ring gear R4 from the first connecting member M1. The direct clutch C2 is engaged, and therefore the fourth planetary gear G4 rotates integrally. The low brake B2 is engaged, and therefore rotation input into the third ring gear R3 from the fourth carrier PC4, which rotates integrally with the fourth ring gear R4, via the second connecting member M2 is reduced by the third planetary gear G3 and output from the third carrier PC3. Hence, the fourth planetary gear G4 contributes to torque transmission but does not contribute to the reduction operation.

In other words, the third speed is defined by a line linking an engagement point of the 2346 brake B3 that reduces the rotation output from the engine and an engagement point of the low brake B2 that reduces the reduced rotation from the second planetary gear G2, and therefore the rotation input from the input shaft INP is reduced and output from the output gear OUT.

In the third speed, torque acts on the 2346 brake B3, the low brake B2, the direct clutch C2, the first connecting member M1, the second connecting member M2, and the third connecting member M3. In other words, the second planetary gear G2 and the second planetary gear set GS2 contribute to torque transmission.

During an upshift from the second speed to the third speed, the second one-way clutch F2 is disengaged at a point where an engagement capacity of the direct clutch C2 is secured by disengaging the H&LR clutch C3 slightly early and then starting to engage the direct clutch C2. In so doing, an improvement in shift timing precision can be achieved.

At this time, as shown by the solenoid valve operation table in FIG. 4, engagement pressure is supplied to the desired clutches and brakes by switching the first, second, fourth, fifth and seventh solenoid valves SOL1, SOL2, SOL4, SOL5, SOL7 ON and switching the other solenoid valves OFF.

(Fourth Speed)

As shown in FIG. 3, the fourth speed is obtained by engaging the 2346 brake B3, the direct clutch C2, and the H&LR clutch C3.

In the fourth speed, the 2346 brake B3 is engaged, and therefore the rotation input into the second ring gear R2 from the input shaft INP is reduced by the second planetary gear G2 alone. This reduced rotation is output to the fourth ring gear R4 from the first connecting member M1. The direct clutch C2 and the H&LR clutch C3 are engaged, and therefore the second planetary gear set GS2 rotates integrally. Hence, the rotation input into the fourth ring gear R4 is output from the third carrier PC3 as is.

In the fourth speed, torque acts on the 2346 brake B3, the direct clutch C2, the H&LR clutch C3, the first connecting member M1, the second connecting member M2, and the third connecting member M3. In other words, the second planetary gear G2 and the second planetary gear set GS2 contribute to torque transmission.

At this time, as shown by the solenoid valve operation table in FIG. 4, engagement pressure is supplied to the desired clutches and brakes by switching the second and fifth solenoid valves SOL2, SOL5 ON and switching the other solenoid valves OFF.

Further, since the seventh solenoid valve SOL7 is OFF, the first switch valve SV1 moves to the right of FIG. 2 such that the low brake B2 communicates with a drain circuit and the second pressure regulating valve CV2 communicates with the input clutch C1 (an interlocking condition is prevented). Furthermore, since the D range pressure is exerted on the fourth port c4, the second switch valve SV2 moves to the left in FIG. 2 such that the first port c1 communicates with the third port c3. The sixth pressure regulating valve CV6 moves upward in FIG. 2, and therefore regulated oil pressure is supplied to the fourth switch valve SV4.

The D range pressure acts on the fourth switch valve SV4, and therefore the oil passage 121 communicates with the oil passage 123. The oil passage 122 communicates with the drain circuit, and therefore oil pressure is supplied to the direct clutch C2 but not supplied to the third switch valve SV3. The signal pressure is not supplied to the port d4 from the seventh solenoid valve SOL7, and therefore the third switch valve SV3 moves to the right in FIG. 2. As a result, the second port d2 communicates with the third port d3 but the R range pressure is not supplied to the oil passage 106c (the R range pressure is blocked by the manual valve MV), and therefore no oil pressure is supplied to the reverse brake B4.

(Fifth Speed)

As shown in FIG. 3, the fifth speed is obtained by engaging the input clutch C1, the direct clutch C2, and the H&LR clutch C3.

In the fifth speed, the input clutch C1 is engaged, and therefore the rotation of the input shaft INP is input into the second connecting member M2. The direct clutch C2 and the H&LR clutch C3 are engaged, and therefore the third planetary gear G3 rotates integrally. Hence, the rotation of the input shaft INP is output from the third carrier PC3 as is.

In the fifth speed, torque acts on the input clutch C1, the direct clutch C2, the H&LR clutch C3, and the second connecting member M2. In other words, only the third planetary gear G3 contributes to torque transmission.

At this time, as shown by the solenoid valve operation table in FIG. 4, engagement pressure is supplied to the desired clutches and brakes by switching all of the solenoid valves SOL1 to SOL7 OFF.

(Sixth Speed)

As shown in FIG. 3, the sixth speed is obtained by engaging the input clutch C1, the H&LR clutch C3, and the 2346 brake B3.

In the sixth speed, the input clutch C1 is engaged, and therefore the rotation of the input shaft INP is input into the second ring gear and the second connecting member M2. The 2346 brake B3 is engaged, and therefore the rotation reduced by the second planetary gear G2 is output to the fourth ring gear R4 from the first connecting member M1. The H&LR clutch C3 is engaged, and therefore the second planetary gear set GS2 outputs rotation defined by the rotation of the fourth ring gear R4 and the rotation of the second connecting member M2* from the third carrier PC3.

In the sixth speed, torque acts on the input clutch C1, the H&LR clutch C3, the 2346 brake B3, the first connecting member M1, the second connecting member M2, and the third connecting member M3. In other words, the second planetary gear G2 and the second planetary gear set GS2 contribute to torque transmission.

At this time, as shown by the solenoid valve operation table in FIG. 4, engagement pressure is supplied to the desired clutches and brakes by switching the fifth and sixth solenoid valves SOL5, SOL6 ON and switching the other solenoid valves SOL1, SOL2, SOL3, SOL4, SOL7 OFF.

(Seventh Speed)

As shown in FIG. 3, the seventh speed is obtained by engaging the input clutch C1, the H&LR clutch C3, and the front brake B1 (the one-way clutch F1).

In the seventh speed, the input clutch C1 is engaged, and therefore the rotation of the input shaft INP is input into the second ring gear and the second connecting member M2. The front brake B1 is engaged, and therefore the rotation reduced by the first planetary gear set GS1 is output to the fourth ring gear R4 from the first connecting member M1. The H&LR clutch C3 is engaged, and therefore the second planetary gear set GS2 outputs rotation defined by the rotation of the fourth ring gear R4 and the rotation of the second connecting member M2* from the third carrier PC3.

In the seventh speed, torque acts on the input clutch C1, the H&LR clutch C3, the front brake B1, the first connecting member M1, the second connecting member M2, and the third connecting member M3. In other words, the first planetary gear set GS1 and the second planetary gear set GS2 contribute to torque transmission.

At this time, as shown by the solenoid valve operation table in FIG. 4, engagement pressure is supplied to the desired clutches and brakes by switching the third and sixth solenoid valves SOL3, SOL6 ON and switching the other solenoid valves SOL1, SOL2, SOL4, SOL5, SOL7 OFF.

(Reverse)

As shown in FIG. 3, reverse is obtained by engaging the H&LR clutch C3, the front brake B1, and the reverse brake B4.

In reverse, the front brake B1 is engaged, and therefore the rotation reduced by the first planetary gear set GS1 is output to the fourth ring gear R4 from the first connecting member M1. The H&LR clutch C3 is engaged and the reverse brake B4 is engaged, and therefore the second planetary gear set GS2 outputs rotation defined by the rotation of the fourth ring gear R4 and a fixed condition of the second connecting member M2 from the third carrier PC3.

In other words, reverse is defined by a line linking respective engagement points of the front brake B1 that reduces the rotation output from the engine via the first planetary gear set GS1, the reverse brake B4 that fixes the rotation of the second connecting member M2, and the H&LR clutch C3 constituting the second planetary gear set GS2, and therefore the rotation input from the input shaft INP is reduced in an opposite direction and output from the output gear OUT.

As regards the torque flow in reverse, torque acts on the H&LR clutch C3, the front brake B1, the reverse brake B4, the first connecting member M1, the second connecting member M2, and the third connecting member M3. In other words, the first planetary gear set GS1 and second planetary gear set GS2 contribute to torque transmission.

At this time, as shown by the solenoid valve operation table in FIG. 4, engagement pressure is supplied to the desired clutches and brakes by switching the second, third and sixth solenoid valves SOL2, SOL3, SOL6 ON and switching the other solenoid valves SOL1, SOL4, SOL5, SOL7 OFF. The seventh solenoid valve SOL7 is switched ON at the beginning of an R range switch and switched OFF following engagement completion.

The R range pressure is supplied to the reverse brake B4 via the third switch valve SV3. The R range does not have a dedicated pressure regulating valve, and therefore, at the beginning of engagement, the sixth pressure regulating valve CV6 used in the direct clutch C2 is employed to regulate the engagement pressure of the reverse brake B4. When the manual valve MV initially switches to the R range pressure, the second switch valve SV2 moves to the right in FIG. 2 such that the R range pressure is supplied to the sixth pressure regulating valve CV6. The fourth switch valve SV4 moves to the left in FIG. 2 such that the oil passage 121 communicates with the oil passage 122. As a result, oil pressure regulated by the sixth pressure regulating valve CV6 is led into the oil passage 122.

When the seventh solenoid valve SOL7 is switched ON in this state, the third switch valve SV3 moves to the left in FIG. 2 such that the oil passage 122 communicates with an oil passage 130. Hence, while the seventh solenoid valve SOL7 remains ON, the engagement pressure of the reverse brake B4 is controlled by oil pressure regulated by the sixth pressure regulating valve CV6. When engagement is complete, the seventh solenoid valve SOL7 is switched OFF. Accordingly, the third switch valve SV3 moves to the right in FIG. 2 such that the oil passage 106c communicates with the oil passage 130, and as a result, the R range pressure is introduced as is, whereby the engaged condition is maintained.

Hence, by providing the third switch valve SV3 and the fourth switch valve SV4, the engagement pressures of two clutches or brakes can be controlled using a single pressure regulating valve.

Figure 5:
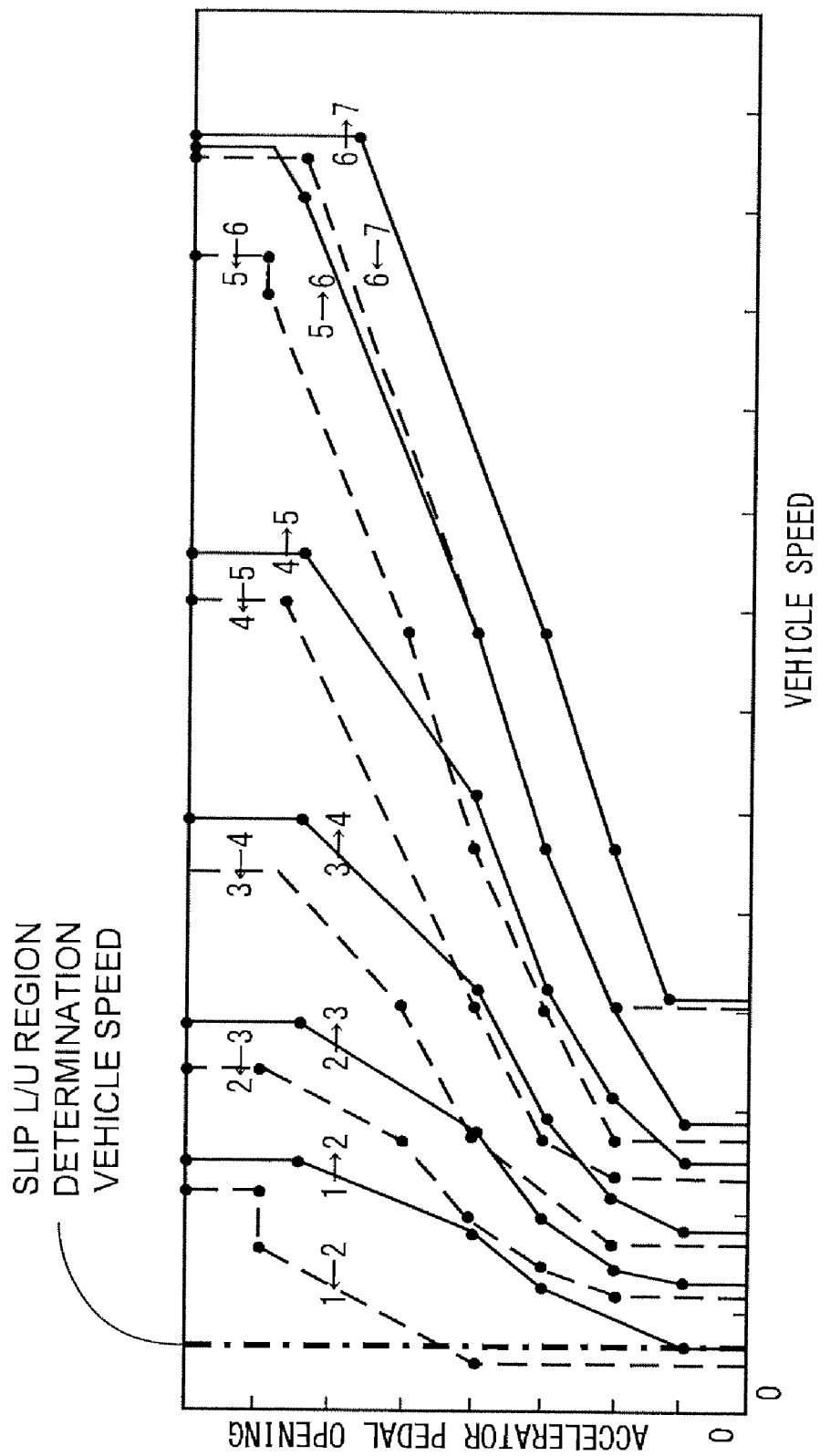
FIG. 5 is an illustrative view of a shift map according to an embodiment of this invention.

A normal seven speed shift map has the characteristics shown in FIG. 5, for example, wherein shift regions are defined using the vehicle speed Vsp calculated on the basis of the output shaft rotation speed sensor 5 and the accelerator opening APO obtained by the accelerator opening sensor 1 as parameters and an upshift or a downshift is executed when an upshift line or a downshift line is crossed.

Next, lockup control of the torque converter TC in the automatic transmission according to the above embodiment will be described.

The ATCU 20 obtains an operating condition of the vehicle and determines whether to set the lockup clutch LUC of the torque converter TC in an engaged condition or a disengaged condition on the basis of the operating condition. The engagement condition of the lockup clutch LUC of the torque converter TC is then controlled on the basis of the determination result.

More specifically, the ATCU 20 obtains the vehicle speed Vsp as the operating condition. The ATCU 20 compares the vehicle speed Vsp to a lockup region determination vehicle speed (Slip L/U region determination vehicle speed) indicated by a dot-dash line on the shift map in FIG. 5.

When the vehicle speed Vsp is equal to or higher than the Slip L/U region determination vehicle speed, a lockup region is determined, and therefore the ATCU 20 controls the lockup clutch LUC to the engaged condition. When the vehicle speed Vsp is lower than the Slip L/U region determination vehicle speed, a torque converter (T/C) region is determined, and therefore the ATCU 20 controls the lockup clutch LUC to the disengaged condition.

In this embodiment, the engagement condition of the lockup clutch LUC includes slip lockup (also referred to as "Slip L/U" hereafter), in which a difference between an input rotation speed and an output rotation speed of the torque converter TC is controlled to a predetermined range (several tens of rpm, for example).

By executing this control, the engagement condition of the lockup clutch LUC of the torque converter TC is controlled on the basis of the operating condition of the vehicle.

In this embodiment, a determination reference (vehicle speed) at which the lockup clutch LUC is set in the engaged condition and a determination reference (vehicle speed) at which the lockup clutch LUC is set in the disengaged condition are identical, and therefore the engagement region of the lockup clutch LUC is enlarged, leading to an improvement in fuel efficiency.

When the ATCU 20 determines that the torque converter TC is to be set in the engaged condition or the disengaged condition, the ATCU 20 outputs a control command to the CVU 30. Upon reception of the control command, the CVU 30 controls the engagement condition of the lockup clutch LUC.

Figure 6:
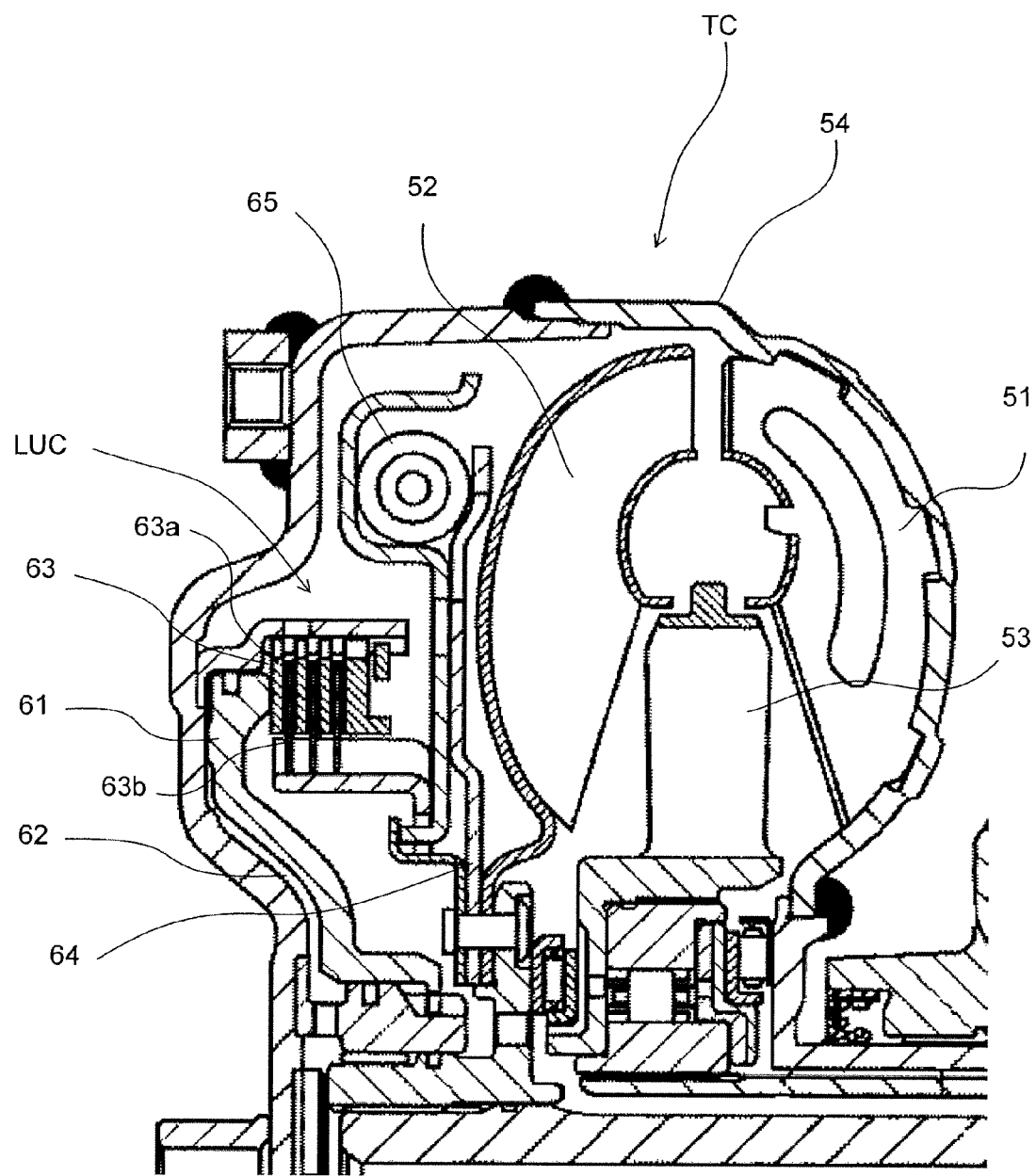
FIG. 6 is a sectional view showing the main parts of a torque converter according to an embodiment of this invention.

FIG. 6 is a sectional view showing the main parts of the torque converter TC according to this embodiment.

The torque converter TC comprises a pump impeller 51 serving as an input element, a turbine runner 52 serving as an output element, and a stator 53 serving as a reaction force element.

The pump impeller 51 is driven by a rotary force from an engine, not shown in the figure, via a torque converter cover 54.

The turbine runner 52 is housed in a converter chamber formed by the pump impeller 51 and the converter cover 54, and disposed opposite the pump impeller 51. The stator 53 is interposed between an inner periphery of the pump impeller 51 and an inner periphery of the turbine runner 52.

With this constitution, the pump impeller 51 rotated by the engine rotation agitates a working fluid, the turbine runner 52 is driven by a reaction force generated by the stator 53 while increasing torque, then the engine rotation is transmitted to the transmission side from the turbine runner 52 via an output shaft.

In this converter condition, the torque converter TC is advantaged in being able to absorb torque increases and torque variation when engine rotation is transmitted. However, relative rotation (slippage) occurs between the pump impeller 51 and the turbine runner 52, leading to a reduction in transmission efficiency.

Therefore, when torque increases and torque variation do not need to be absorbed, the pump impeller 51 and turbine runner 52 are directly coupled mechanically by setting the lockup clutch LUC in the engaged condition.

The lockup clutch LUC comprises a piston 61, a piston oil chamber 62, a multiple disk clutch 63, a hub disk 64, and a torsional damper 65.

The multiple disk clutch 63 is constituted by a clutch disk group 63a and a clutch disk group 63b, wherein the clutch disk group 63a is coupled to the converter cover 54 and the clutch disk group 63b is coupled to the hub disk 64. The clutch disk group 63a is biased to a disengagement side by a return spring, not shown in the figure.

The hub disk 64 is coupled to the turbine runner 52 so as to rotate together with the turbine runner 52.

The piston 61 is spline-fitted to the converter cover 54 to be capable of sliding freely in an axial direction. The piston oil chamber 62 is formed between the piston 61 and the converter cover 54 such that the piston 61 is moved in an engagement direction by the pressure of working oil existing in the interior thereof.

When a command to engage the lockup clutch LUC is issued by the ATCU 20, the CVU 30 moves the piston 61 in the engagement direction by increasing the oil pressure of the piston oil chamber 62. Accordingly, the clutch disk group 63a moves in the engagement direction, thereby becoming pressed against the clutch disk group 63b, and as a result, the multiple disk clutch 63 enters the engaged condition.

By means of this operation, the lockup clutch LUC enters the engaged condition, and as a result, a lockup (L/U) condition in which the pump impeller 51 and the turbine runner 52 are directly coupled mechanically is established.

When a command to disengage the lockup clutch LUC is issued by the ATCU 20, on the other hand, the CVU 30 drains the oil pressure of the piston oil chamber 62. Accordingly, the clutch disk group 63a is moved in a disengagement direction by an elastic force of the return spring so as to separate from the clutch disk group 63b, and as a result, the multiple disk clutch 63 enters the disengaged condition.

By means of this operation, the lockup clutch LUC enters the disengaged condition, and as a result, a torque conversion (T/C) condition in which the pump impeller 51 and the turbine runner 52 rotate while exhibiting a torque increasing action is established.

The ATCU 20 feedback-controls the oil pressure supplied in the engaged condition in accordance with an input/output rotation difference, and in so doing the ATCU 20 can perform Slip L/U control to control a difference between the input rotation speed and the output rotation speed of the torque converter TC to a predetermined range.

In the operation to engage the lockup clutch LUC, the following operations are performed from a point at which the CVU 30 increases the oil pressure to a point at which the multiple disk clutch 63 is actually engaged.

The piston 61 is biased in the disengagement direction by the return spring. When an engagement command is issued, the piston 61 is moved by the increase in the oil pressure of the piston oil chamber 62, and as a result, the piston 61 contacts the clutch disk group 63a. When further oil pressure is supplied, the clutch disk group 63a is moved in the engagement direction against a biasing force of the return spring by the movement of the piston 61, and as a result, the clutch disk group 63a contacts the clutch disk group 63b.

When the lockup clutch LUC is engaged from the disengaged condition against the biasing force of the return spring, CVU 30 performs a control to increase the amount of supplied working oil by setting the oil pressure higher than a target oil pressure (an oil pressure required for engagement) so that an interval between the piston 61 and the clutch disk group 63a and an interval between the clutch disk group 63a and the clutch disk group 63b are filled (looseness therebetween is eliminated). This control is typically known as "precharge control".

Meanwhile, in a case where the engaged condition is determined and a precharge operation is started in the lockup clutch LUC, the disengaged condition is determined immediately thereafter such that the precharge operation is terminated and the working oil is drained, and then the engaged condition is determined again such that a new precharge operation is started, the oil pressure must be increased in order to perform the precharge control again. As a result, a time loss occurs during establishment of the engaged condition.

This time loss corresponds to a reduction in the engagement region, which may lead to deterioration of the fuel efficiency.

Hence, in this embodiment, deterioration of the fuel efficiency is prevented by executing the control to be described below.

Figure 7:
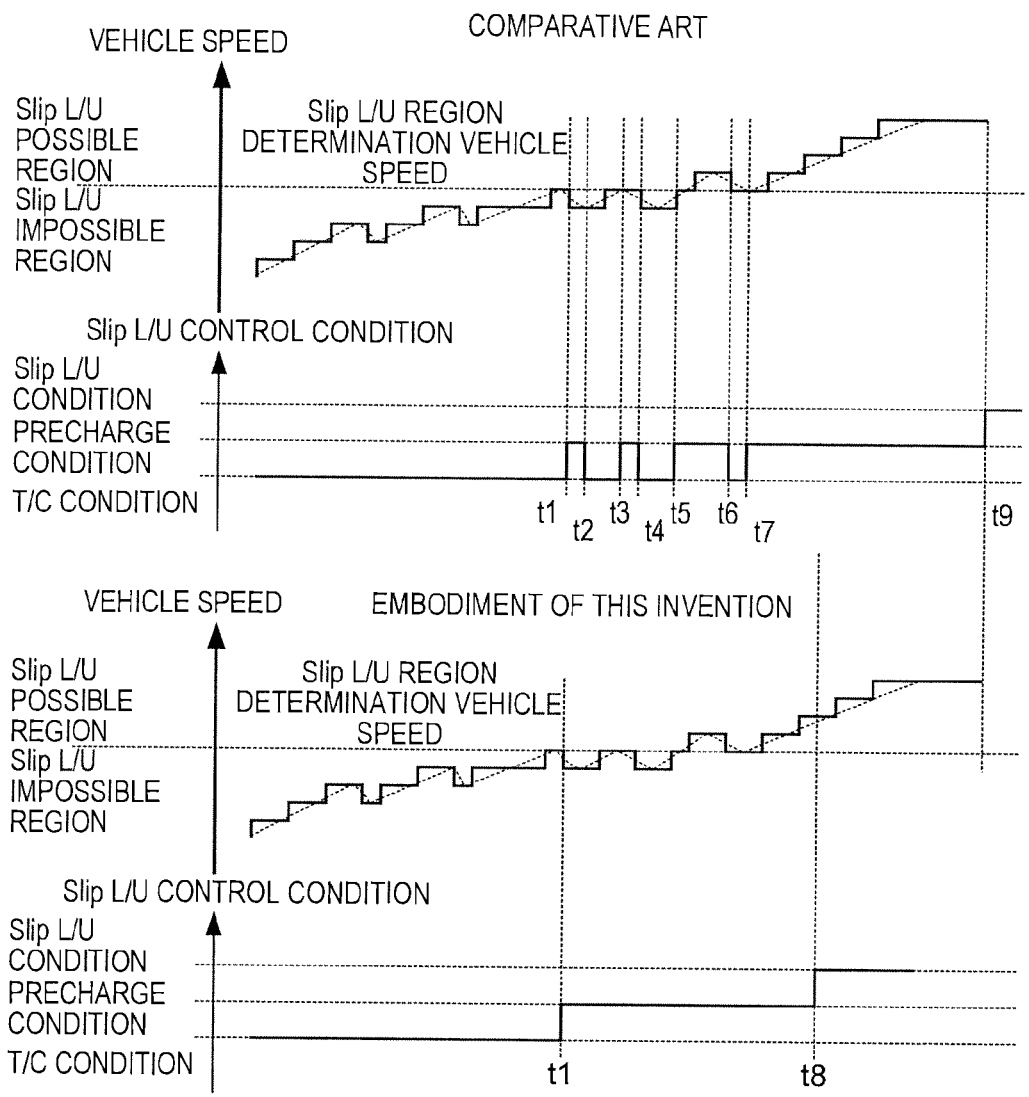
FIG. 7 is a time chart showing control of a lockup clutch according to an embodiment of this invention.

FIG. 7 is a time chart showing control of the lockup clutch LUC according to this embodiment.

On the time chart in FIG. 7, control according to a comparative art is shown in an upper section and the control according to this embodiment is shown in a lower section.

When it is determined that the lockup clutch LUC is to be engaged from the disengaged condition (the T/C condition), first the precharge control is performed, and once the precharge control is complete, a Slip L/U condition is established.

Here, an operating condition in which the ATCU 20 determines the engaged condition and the disengaged condition repeatedly and frequently while the vehicle speed remains static in the vicinity of a Slip L/U region determination vehicle speed is envisaged.

In the comparative art, when the ATCU 20 outputs an engagement command, the CVU 30 performs the precharge control before engaging the lockup clutch LUC. When the ATCU 20 determines the disengaged condition and outputs a disengagement command during the precharge control, the CVU 30 interrupts the precharge control, drains the working oil, and controls the lockup clutch LUC to the disengaged condition (timings t1 to t7).

After repeating this control, if a disengagement command is not output before precharging is complete, the lockup clutch LUC is controlled to the engaged state (timing t9).

In this embodiment, on the other hand, when an operating condition under which the ATCU 20 determines the engaged condition and the disengaged condition repeatedly and frequently occurs while the vehicle speed remains static in the vicinity of the Slip L/U region determination vehicle speed and a disengagement command is output before the precharge control is complete, the precharge control is continued without interruption. Then, when the vehicle speed is equal to or higher than the Slip L/U region determination vehicle speed at the completion point of the precharge control, the lockup clutch LUC is controlled to the engaged condition (timing t8).

Hence, by not draining the control oil pressure as soon as the disengaged condition is determined, a switch to the engaged condition can be achieved quickly.

Figure 8:
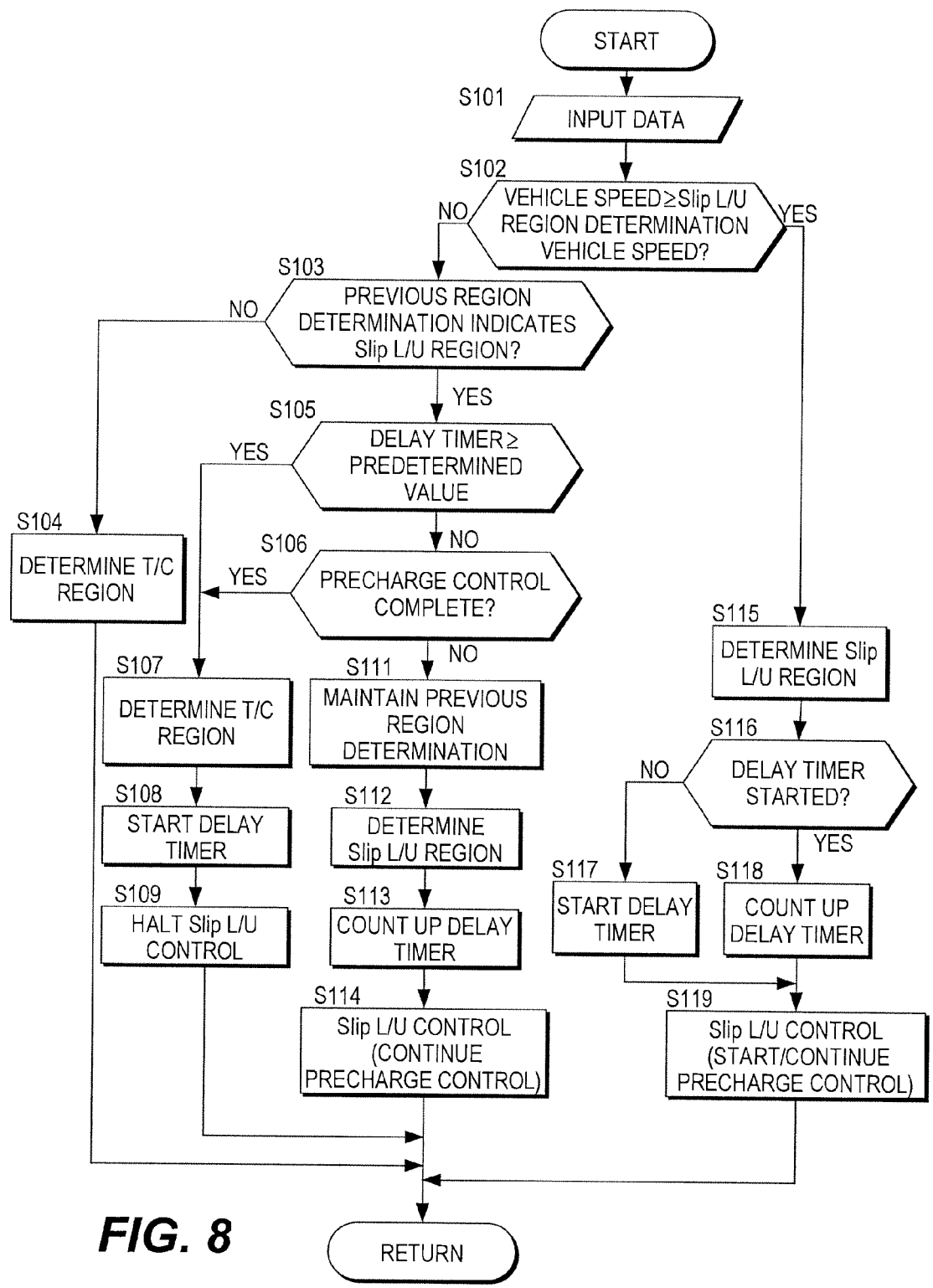
FIG. 8 is a flowchart showing lockup clutch control executed by an ATCU according to an embodiment of this invention.

FIG. 8 is a flowchart showing control of the lockup clutch LUC executed by the ATCU 20 according to this embodiment.

The flowchart of FIG. 8 is executed by the ATCU 20 in predetermined periods (every 10 msec, for example).

Following the start of the processing in the flowchart of FIG. 8, the ATCU 20 obtains data relating to current operating conditions of the vehicle (S101). More specifically, the ATCU 20 obtains signals from the first turbine rotation speed sensor 3, the second turbine rotation speed sensor 4, the output shaft rotation speed sensor 5, the inhibitor switch 6, and so on. Further, the accelerator pedal opening APO, the engine rotation speed N, and so on are obtained from the ECU 10.

The ATCU 20 then obtains data (the vehicle speed Vsp, the accelerator pedal opening APO, and so on) relating to the control to be executed on the basis of the signal values obtained from the respective sensors.

Next, the ATCU 20 refers to a pre-stored shift map (FIG. 5) to determine whether or not the obtained vehicle speed Vsp is in the engagement region, or in other words whether or not the vehicle speed Vsp is equal to or higher than the Slip L/U region determination vehicle speed (S102).

When the ATCU 20 determines as a result of the determination that the vehicle speed Vsp is lower than the Slip L/U region determination vehicle speed, the routine advances to a step S103. When the ATCU 20 determines that the vehicle speed Vsp is equal to or higher than the Slip L/U region determination vehicle speed, the routine advances to a step S115.

In the step S103, the ATCU 20 determines whether or not a previous region determination result indicates the Slip L/U region. The previously determined region is a determination result obtained during control (steps S104, S107, S112, S115) executed immediately before the control according to this flowchart.

When the previous determination result does not indicate the Slip L/U region, i.e. the previous determination result indicates the T/C region, the routine advances to a step S104. When the previous determination result indicates the Slip L/U region, the routine advances to a step S105.

In the step S104, the current vehicle speed Vsp is lower than the Slip L/U region determination vehicle speed and the previous determination result indicates the T/C region, and therefore the ATCU 20 continues to determine the T/C region. The processing according to this flowchart is then temporarily terminated.

When the ATCU 20 determines in the step S103 that the previous determination result indicates the Slip L/U region, this means that a shift has occurred from the Slip L/U region to the T/C region.

When a shift is determined to have occurred from the Slip L/U region to the T/C region, this indicates that precharge control of the piston 61 of the lockup clutch LUC has been started in accordance with the previously determined Slip L/U region. Here, a determination is made as to whether or not the precharge operation is complete by determining whether or not predetermined conditions (steps S105 and S106) to be described below are established. When the precharge control is not yet complete, the precharge control is continued by maintaining the engagement command in relation to the lockup clutch LUC rather than immediately switching the command to the disengagement command.

By executing this control, it is possible to prevent the time lag that occurs when the oil pressure is drained at the end of the precharge control and then the Slip L/U region is determined again such that new precharge control is executed. As a result, the engagement region can be enlarged, leading to an improvement in fuel efficiency.

First, in the step S105, the ATCU 20 determines whether or not a T/C region determination delay timer is equal to or greater than a predetermined value. When the T/C region determination delay timer is equal to or greater than the predetermined value, or in other words when the T/C region determination delay timer has expired, the routine advances to a step S107. When the T/C region determination delay timer is smaller than the predetermined value or when the T/C region determination delay timer has not yet been started, the routine advances to the step S106.

An expiry time of the T/C region determination delay timer is set to be equal to or greater than an estimated time required to complete the precharge control following the start of the precharge control.

In the step S106, the ATCU 20 determines whether or not the precharge control is complete.

During the precharge control, the CVU 30 controls a stroke amount of the piston 61 by controlling the oil pressure. When the stroke amount of the piston 61 is determined to be sufficient to set the lockup clutch LUC in the engaged state on the basis of the oil pressure control amount, the precharge control is determined to be complete. When the ATCU 20 determines that the precharge control is complete, the routine advances to the step S107, and when the ATCU 20 determines that the precharge control is not yet complete, the routine advances to a step S111.

Through the processing of the steps S105 and S106, the ATCU 20 determines that the precharge control is underway even when the determination based on the vehicle speed Vsp switches to the T/C region. Hence, in the step S111, the previous region determination, i.e. the Slip L/U region, is maintained, and therefore the lockup clutch LUC is determined to be in the Slip L/U region (S112).

Next, the ATCU 20 counts up the T/C region determination delay timer by adding one to the T/C region determination delay timer (S113).

Next, the ATCU 20 continues precharge control in the Slip L/U region by outputting an engagement command in the Slip L/U region (S114). Upon reception of the command, the CVU 30 continues the precharge control. The processing of this flowchart is then temporarily terminated.

When the ATCU 20 determines that the precharge control is complete, on the other hand, the ATCU 20 determines the T/C region in the step S107. The ATCU 20 then clears the T/C region determination delay timer by setting the T/C region determination delay timer at zero (S108).

Next, the ATCU 20 outputs a disengagement command to the CVU 30 in order to halt the Slip L/U control. Upon reception of the command, the CVU 30 controls the lockup clutch LUC to the disengaged condition. The processing of this flowchart is then temporarily terminated.

When the ATCU 20 determines in the step S102 that the vehicle speed Vsp is equal to or higher than the Slip L/U region determination vehicle speed, the ATCU 20 determines the Slip L/U region in a step S115.

Next, the ATCU 20 determines whether or not the T/C region determination delay timer has already been started (S116). When the T/C region determination delay timer has not yet been started, the ATCU 20 starts the T/C region determination delay timer in a step S117. When the T/C region determination delay timer has already been started, the ATCU 20 counts up the T/C region determination delay timer in a step S118 by adding one to the T/C region determination delay timer.

Next, the ATCU 20 starts or continues precharge control of the lockup clutch LUC by outputting an engagement command in the Slip L/U region (S119). Upon reception of the command, the CVU 30 starts or continues the precharge control. The processing of this flowchart is then temporarily terminated.

With this control, in an operating region where the engagement region and the disengagement region are mutually adjacent following the start of precharge control on the lockup clutch LUC, the precharge control is continued until predetermined conditions are established, and therefore engagement of the lockup clutch LUC can be completed as soon as the engagement region is determined again. Hence, responsiveness up to establishment of the engaged condition can be improved and the engagement region can be enlarged, leading to an improvement in fuel efficiency.

Figure 9:
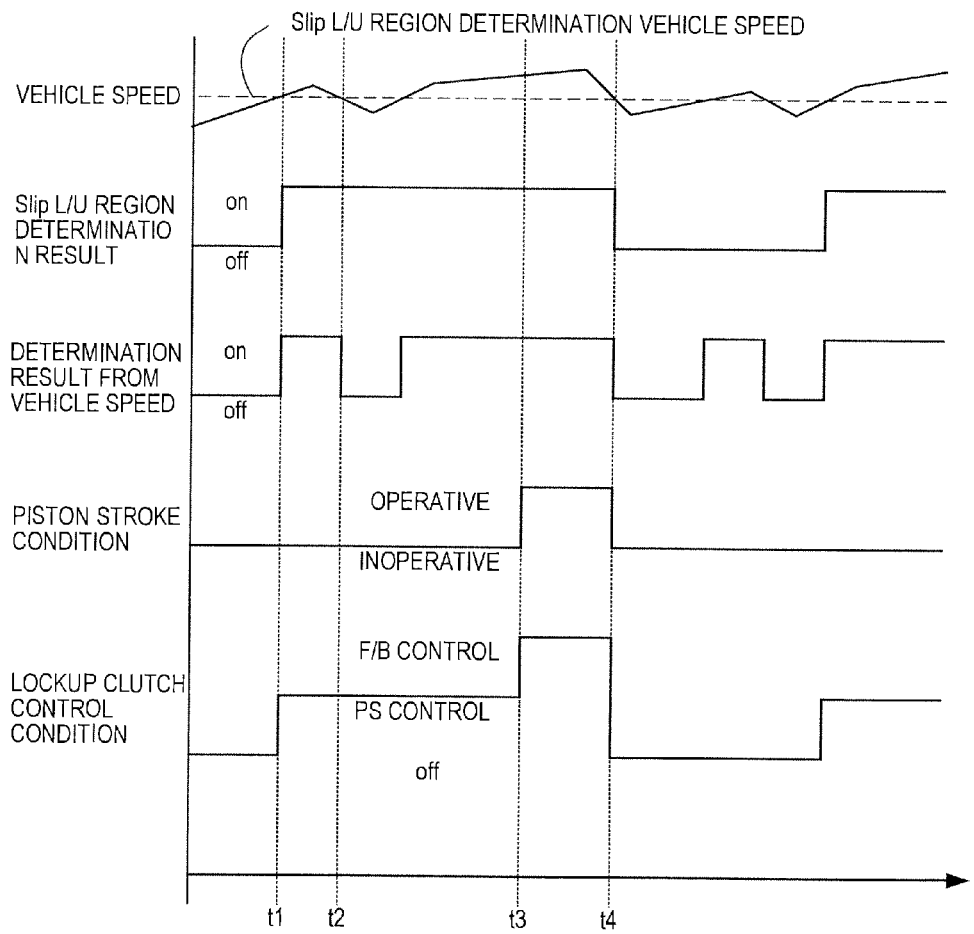
FIG. 9 is a time chart showing the lockup clutch control executed by the ATCU according to an embodiment of this invention.

FIG. 9 is a time chart showing control of the lockup clutch LUC executed by the ATCU 20 according to this embodiment.

The time chart of FIG. 9 shows, in descending order, the vehicle speed Vsp, the Slip L/U region or T/C region determination result, the determination result relating to the vehicle speed Vsp and the Slip L/U region determination vehicle speed, the stroke condition of the piston 61, and the control condition of the CVU 30.

In an initial condition, the vehicle speed Vsp is lower than the Slip L/U region determination vehicle speed, and therefore the determination result indicates the T/C condition.

When the vehicle speed Vsp rises such that the ATCU 20 determines at a timing t1 that the vehicle speed Vsp is equal to or higher than the Slip L/U region determination vehicle speed ("YES" in the step S102 of FIG. 8), the routine advances to the step S115, in which the Slip L/U condition is determined. The ATCU 20 then outputs an engagement command to the CVU 30. On the basis of the engagement command, the CVU 30 starts precharge control on the lockup clutch LUC (the step S119 of FIG. 8).

When the vehicle speed Vsp then falls such that the ATCU 20 determines at a timing t2 that the vehicle speed Vsp is lower than the Slip L/U region determination vehicle speed ("NO" in the step S102 of FIG. 8), the ATCU 20 determines that the previous region determination indicates Slip L/U ("YES" in the step S103 of FIG. 8), and therefore the ATCU 20 determines whether or not the predetermined conditions defined in the steps S105 and S106 of FIG. 8 are established.

In the step S105, the ATCU 20 determines whether or not the T/C region determination delay timer has expired. At the timing t2, the T/C region determination delay timer has not expired, and therefore this condition is not established.

In the step S106, the ATCU 20 determines whether or not the precharge control is complete. At the timing t2, the precharge control is not complete, and therefore this condition is not established.

Hence, at the timing t2, the predetermined conditions are not established, and therefore, even though the vehicle speed Vsp is lower than the Slip L/U region determination vehicle speed, the ATCU 20 maintains the Slip L/U region (the step S111 in FIG. 8). Accordingly, the CVU 30 continues the precharge control in the step S114 of FIG. 8.

When the ATCU 20 determines thereafter that the vehicle speed Vsp equals or exceeds the Slip L/U region determination vehicle speed ("YES" in the step S102 of FIG. 8), the Slip L/U region is determined. When the ATCU 20 determines that the vehicle speed Vsp is lower than the Slip L/U region determination vehicle speed ("NO" in the step S102 of FIG. 8), on the other hand, the previous region determination indicates T/C ("YES" in the step S103 of FIG. 8), and therefore the ATCU 20 repeats the determination as to whether or not the predetermined conditions defined in the steps S105 and S106 of FIG. 8 are established. During repetition of this determination, the T/C region determination delay timer is counted up in the processing of the step S113.

When the vehicle speed Vsp is equal to or higher than the Slip L/U region determination vehicle speed ("YES" in the step S102 of FIG. 8) and precharge control of the lockup clutch LUC is complete at a timing t3, the ATCU 20 controls the lockup clutch to the engaged condition as is. The CVU 30 then feedback-controls the oil pressure of the lockup clutch LUC to control an engagement force thereof.

When the ATCU 20 determines at a timing t4 that the vehicle speed Vsp is lower than the Slip L/U region determination vehicle speed ("NO" in the step S102 of FIG. 8), the previous region determination indicates the T/C region ("NO" in the step S103 of FIG. 8), and therefore the T/C region is set in the step S104.

Figure 10:
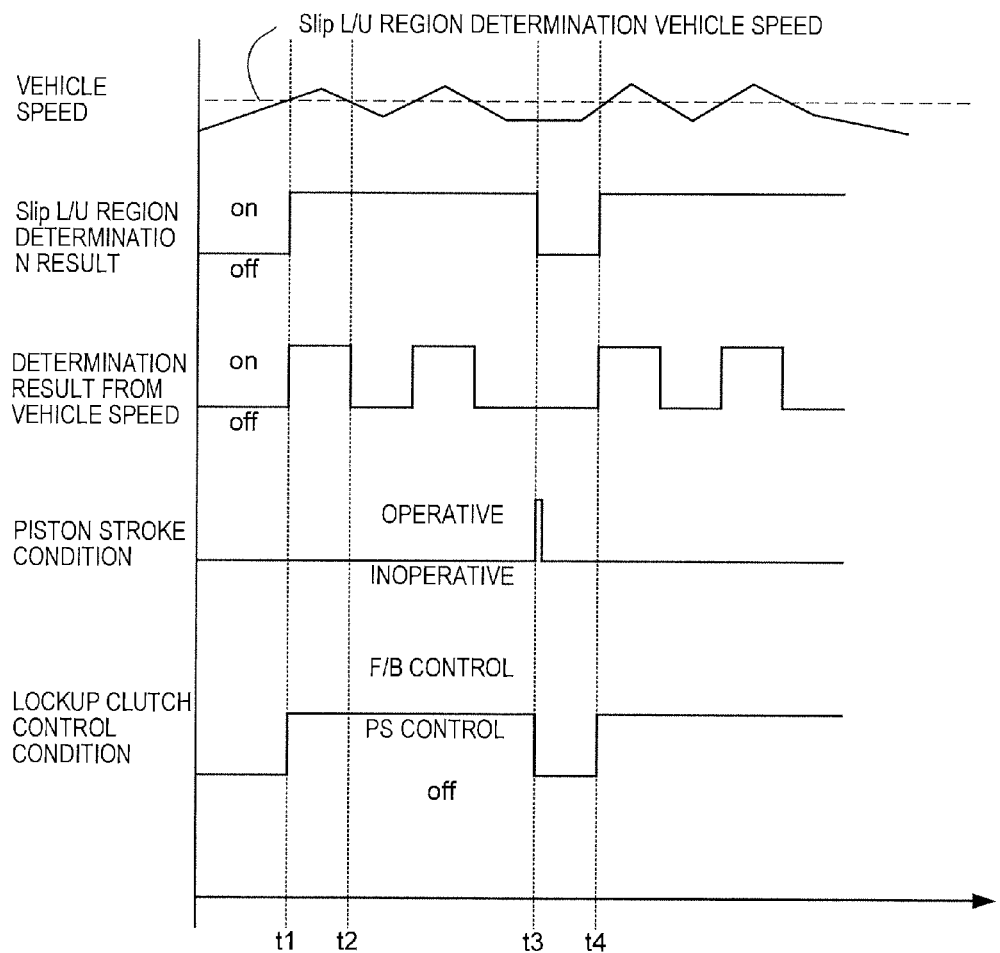
FIG. 10 is another example of a time chart showing the lockup clutch control executed by the ATCU according to an embodiment of this invention.

FIG. 10 is another example of a time chart showing control of the lockup clutch LUC executed by the ATCU 20 according to this embodiment.

In the initial condition, the vehicle speed Vsp is lower than the Slip L/U region determination vehicle speed, and therefore the determination result indicates the T/C condition.

Similarly to FIG. 9, when the vehicle speed Vsp rises such that the ATCU 20 determines at a timing t1 that the vehicle speed Vsp is equal to or higher than the Slip L/U region determination vehicle speed ("YES" in the step S102 of FIG. 8), the routine advances to the step S115, in which the Slip L/U condition is determined. The ATCU 20 then outputs an engagement command to the CVU 30. On the basis of the engagement command, the CVU 30 starts precharge control of the lockup clutch LUC (the step S119 of FIG. 8).

When the vehicle speed Vsp then falls such that the ATCU 20 determines at a timing t2 that the vehicle speed Vsp is lower than the Slip L/U region determination vehicle speed ("NO" in the step S102 of FIG. 8), the ATCU 20 determines that the previous region determination indicates Slip L/U ("YES" in the step S103 of FIG. 8), and therefore a determination is made as to whether or not the predetermined conditions defined in the steps S105 and S106 of FIG. 8 are established.

In the step S105, the ATCU 20 determines whether or not the T/C region determination delay timer has expired. At the timing t2, the T/C region determination delay timer has not expired, and therefore this condition is not established. Further, in the step S106 of FIG. 8, the ATCU 20 determines whether or not the precharge control is complete. At the timing t2, the precharge control is not complete, and therefore this condition is not established.

Hence, at the timing t2, the predetermined conditions are not established, and therefore, even though the vehicle speed Vsp is equal to or higher than the Slip L/U region determination vehicle speed, the ATCU 20 maintains the Slip L/U region (the step S111 in FIG. 8). Accordingly, the CVU 30 continues the precharge control in the step S114 of FIG. 8.

When the ATCU 20 subsequently determines at a timing t3 that the vehicle speed Vsp is lower than the Slip L/U region determination vehicle speed ("NO" in the step S102 of FIG. 8) and that the previous region determination indicates the Slip L/U region ("YES" in the step S103 of FIG. 8), the determinations of the steps S105 and S106 are made.

Here, the ATCU 20 determines that the precharge control is complete ("YES" in the step S106), and therefore the routine advances to the step S107, where the T/C region is determined. Accordingly, the ATCU 20 outputs a command to disengage the lockup clutch LUC.

As described above, in this embodiment of the invention, in a case where the ATCU 20 determines to set the lockup clutch LUC of the torque converter TC in the disengaged condition (T/C) after determining to set the lockup clutch LUC in the engaged condition (Slip L/U), precharge control of the lockup clutch LUC is continued without interruption until predetermined conditions are established. With this constitution, when the ATCU 20 subsequently determines to set the lockup clutch LUC in the engaged condition again, control for setting the lockup clutch LUC in the engaged condition can be switched to immediately, and as a result, the engagement region of the lockup clutch can be enlarged. Accordingly, an improvement in fuel efficiency can be achieved.

Furthermore, the determination reference for determining the engaged condition and the determination reference for determining the disengaged condition in relation to the lockup clutch LUC are set to be identical without inserting hysteresis, and therefore the region in which the engaged condition is set can be enlarged, leading to an improvement in fuel efficiency.

In the above embodiment of this invention, a seven speed automatic transmission is described as an example, but this invention is not limited thereto and may be applied to another stepped transmission. This invention may also be applied to a belt type continuously variable transmission in which a belt, a chain, or similar is sandwiched between pulleys, or a toroidal (full toroidal/half toroidal) continuously variable transmission mechanism in which a power roller is sandwiched between input/output disks.

This invention is not limited to the embodiment described above, and naturally includes various modifications and improvements within the scope of the technical spirit thereof.

This application claims priority from Japanese Patent Application No. 2009-202331 filed Sep. 2, 2009, which is incorporated herein by reference.

What is claimed is:

1. A control device for an automatic transmission having a torque converter, in which a target gear position is set on a basis of a vehicle speed and an engine load, comprising:
   a determining unit that determines whether to set a friction element that locks up the torque converter through oil pressure control in an engaged condition or a disengaged condition on a basis of at least a vehicle speed;
   a control unit that outputs an engagement command or a disengagement command on a basis of a determination result of the determining unit; and
   an oil pressure control unit that controls to engage the friction element upon reception of the engagement command by performing a precharge control that controls oil pressure to set the friction element before the engaged condition and then controlling supplied oil pressure to a predetermined oil pressure and to disengage the friction element upon reception of the disengagement command by draining the oil pressure supplied to the friction element,
   wherein the control unit comprises a prohibiting unit that prohibits output of the disengagement command in relation to the friction element following control of the friction element from the disengaged condition to the engaged condition until the precharge control is completed.

2. The control device as defined in claim 1, wherein the control unit determines that the precharge control is completed when a predetermined time elapses following control of the friction element from the disengaged condition to the engaged condition.

3. The control device as defined in claim 1, wherein the control unit determines that the precharge control is completed when the oil pressure supplied for the friction element is sufficient to set the friction element in the engaged condition following control of the friction element from the disengaged condition to the engaged condition.

4. The control device as defined in claim 1, further comprising:
   a vehicle speed detecting unit that detects a vehicle speed of the vehicle; and
   a storage unit that stores a determination reference used to determine whether to set the friction element in the engaged condition or the disengaged condition,
   wherein the determining unit determines that the friction element is to be set in the engaged condition when the vehicle speed is equal to or higher than the determination reference and determines that the friction element is to be set in the disengaged condition when the vehicle speed is lower than the determination reference.

5. A control method for an automatic transmission having a torque converter, in which a target gear position is set on a basis of a vehicle speed and an engine load, comprising:
- a determining step, for determining whether to set a friction element that locks up a torque converter through oil pressure control in an engaged condition or a disengaged condition on a basis of at least a vehicle speed, using an automatic transmission controller;
- a control step, for outputting an engagement command or a disengagement command on a basis of a determination result of the determining step, using the automatic transmission controller; and
- an oil pressure control step, for performing control to engage the friction element upon reception of the engagement command by performing a precharge control that controls oil pressure to set the friction element before the engaged condition and then controlling supplied oil pressure to a predetermined oil pressure and to disengage the friction element upon reception of the disengagement command by draining the oil pressure supplied to the friction element,
- wherein the control step comprises a prohibiting step for prohibiting output of the disengagement command in relation to the friction element following control of the friction element from the disengaged condition to the engaged condition until the precharge is completed.

6. The control method as defined in claim 5, wherein the control step determines that the precharge control is completed when a predetermined time elapses following control of the friction element from the disengaged condition to the engaged condition.

7. The control method as defined in claim 5, wherein the control step determines that the precharge control is completed when the oil pressure supplied for the friction element is sufficient to set the friction element in the engaged condition following control of the friction element from the disengaged condition to the engaged condition.

8. The control method as defined in claim 5, further comprising:
- a vehicle speed detecting step for detecting a vehicle speed of the vehicle; and
- a storage step for storing a determination reference used to determine whether to set the friction element in the engaged condition or the disengaged condition,
- wherein the determining step determines that the friction element is to be set in the engaged condition when the vehicle speed is equal to or higher than the determination reference and determines that the friction element is to be set in the disengaged condition in when the vehicle speed is lower than the determination reference.

9. A control device for an automatic transmission having a torque converter, in which a target gear position is set on a basis of a vehicle speed and an engine load, comprising:
- determining means for determining whether to set a friction element that locks up a torque converter through oil pressure control in an engaged condition or a disengaged condition on a basis of at least a vehicle speed;
- a control means for outputting an engagement command or a disengagement command on a basis of a determination result of the determining means; and
- an oil pressure control means for performing control to engage the friction element upon reception of the engagement command by performing a precharge control that controls oil pressure to set the friction element before the engaged condition and then controlling supplied oil pressure to a predetermined oil pressure and to disengage the friction element upon reception of the disengagement command by draining the oil pressure supplied to the friction element,
- wherein the control means comprises prohibiting means for prohibiting output of the disengagement command in relation to the friction element following control of the friction element from the disengaged condition to the engaged condition until the precharge control is completed.

10. The control device for an automatic transmission as defined in claim 9, wherein the control means determines that the precharge control is completed when a predetermined time elapses following control of the friction element from the disengaged condition to the engaged condition.

11. The control device as defined in claim 9, wherein the control means determines that the precharge control is completed when the oil pressure supplied for the friction element is sufficient to set the friction element in the engaged condition following control of the friction element from the disengaged condition to the engaged condition.

12. The control device as defined in claim 9, further comprising:
- a vehicle speed detecting means for detecting a vehicle speed of the vehicle; and
- a storage means for storing a determination reference used to determine whether to set the friction element in the engaged condition or the disengaged condition,
- wherein the determining means determines that the friction element is to be set in the engaged condition when the vehicle speed is equal to or higher than the determination reference and determines that the friction element is to be set in the disengaged condition when the vehicle speed is lower than the determination reference.

\* \* \* \* \*